(12) United States Patent
Bacabara et al.

(10) Patent No.: US 8,548,728 B2
(45) Date of Patent: Oct. 1, 2013

(54) DISPLAY DEVICE FOR AN AIRCRAFT INCLUDING MEANS FOR DISPLAYING A NAVIGATION SYMBOLOGY DEDICATED TO OBSTACLE AVOIDANCE

(75) Inventors: Corinne Bacabara, Le Haillan (FR); Christian Nouvel, Merignac (FR)

(73) Assignee: Thales, Neuilly sur Siene (FR)

( * ) Notice: Subject to any disclaimer, the term of this patent is extended or adjusted under 35 U.S.C. 154(b) by 892 days.

(21) Appl. No.: 12/598,060

(22) PCT Filed: May 21, 2008

(86) PCT No.: PCT/EP2008/056294
§ 371 (c)(1),
(2), (4) Date: Oct. 29, 2009

(87) PCT Pub. No.: WO2008/145593
PCT Pub. Date: Dec. 4, 2008

(65) Prior Publication Data
US 2010/0131201 A1 May 27, 2010

(30) Foreign Application Priority Data
May 25, 2007 (FR) ..................................... 07 03737

(51) Int. Cl.
*G06F 17/10* (2006.01)
(52) U.S. Cl.
USPC .............................................. 701/301; 701/3
(58) Field of Classification Search
USPC ............... 701/3, 10, 300–302; 340/945, 961, 340/963, 971, 980
See application file for complete search history.

(56) References Cited

U.S. PATENT DOCUMENTS

| 4,706,199 | A | * | 11/1987 | Guerin | 701/300 |
| 5,086,396 | A | | 2/1992 | Waruszewski, Jr. | |
| 6,571,166 | B1 | * | 5/2003 | Johnson et al. | 701/120 |
| 2005/0206533 | A1 | * | 9/2005 | Rogers et al. | 340/979 |
| 2006/0052912 | A1 | * | 3/2006 | Meunier | 701/10 |

FOREIGN PATENT DOCUMENTS

FR 2813963 A1 3/2002
WO 2004070677 A2 8/2004

OTHER PUBLICATIONS

U.S. Appl. No. 12/542,008, filed Aug. 17, 2009, Bacabara et al. (Not Yet Published).
U.S. Appl. No. 12/547,595, filed Aug. 26, 2009, Bacabara et al. (Not Yet Published).
U.S. Appl. No. 12/542,114, filed Aug. 17, 2009, Nouvel et al. (Not Yet Published).
U.S. Appl. No. 12/542,965, filed Aug. 18, 2009, Nouvel et al. (Not Yet Published).
U.S. Appl. No. 12/540,920, filed Aug. 13, 2009, Nouvel et al. (Not Yet Published). U.S. Appl. No. 12/598,003, filed Oct. 28, 2009, Bacabara et al. (Not Yet Published).
U.S. Appl. No. 12/597,957, filed Oct. 28, 2009, Bacabara et al. (Not Yet Published).

* cited by examiner

*Primary Examiner* — Yonel Beaulieu
(74) *Attorney, Agent, or Firm* — Lowe Hauptman & Ham, LLP

(57) ABSTRACT

The general field of the invention is, within the framework of terrain anti-collision systems for aircraft, the presentation on navigation aid displays of a simplified symbology suited to these critical situations. More precisely, the symbols comprise at least one arrow representing the direction of the ground speed vector with respect to the axis of the airplane and at least one set of straight segments representing the limit boundaries in plan view beyond which the aircraft will inevitably crash. Other symbols such as the indication of the instructed course supplement this symbology.

8 Claims, 5 Drawing Sheets

DISPLAY DEVICE FOR AN AIRCRAFT INCLUDING MEANS FOR DISPLAYING A NAVIGATION SYMBOLOGY DEDICATED TO OBSTACLE AVOIDANCE

CROSS-REFERENCE TO RELATED APPLICATIONS

The present application is based on International Application No. PCT/EP2008/056294, filed on May 21, 2008, which in turn corresponds to French Application No. 0703737 filed on May 25, 2007, and priority is hereby claimed under 35 USC §119 based on these applications. Each of these applications are hereby incorporated by reference in their entirety into the present application.

BACKGROUND OF THE INVENTION

1. Field of the Invention

The field of the invention is that of flight management systems for aircraft comprising a terrain anti-collision system and a collimated viewing device able to present symbologies dedicated to the avoidance of obstacles.

2. Description of the Prior Art

In the aeronautical sector, collisions with the ground without loss of control, commonly called CFITs, the acronym standing for "Controlled Flight Into Terrain" are the prime cause of catastrophic accidents to civilian airplanes. The aeronautical industry is concentrating its efforts on means for reducing and ultimately eliminating all future CFIT accidents.

For thirty years now, to solve this problem, the aeronautical industry has been developing a tool called GPWS standing for "Ground Proximity Warning System". However, GPWS has no systems for recognizing the situation of the terrain and does not know the relative trajectory of the airplane with respect to the terrain. The ever growing increase in air traffic has given rise to a new growth of CFITs despite the quasi-generalized use of GPWS. Today, CFITs still represent more than 40% of accidents.

The technological advances obtained notably in the development of digitized terrain files, in the precision of positioning by virtue of GPS location and in increased processing power have allowed the development of new concepts making it possible to guard against these risks of collision with the ground. These concepts rely essentially on extrapolation of the current trajectory of the airplane and on a terrain database corresponding to the relief overflown making it possible to predict these risks. These concepts are materialized in the form of a new generation of equipment intended for transport or business planes, called TAWS for "Terrain Awareness and Warning System". This system is, for example, marketed by the company THALES AVIONICS under the brand name GCAM standing for "Ground Collision Avoidance Module".

The GCAM system is described in FIG. 1. It essentially comprises a central electronic computer linked on the one hand to the network of sensors and pick-ups of the aircraft and on the other hand, to the various displays of the instrument panel as well as to the audible alarms disposed in the cockpit by means of a data transmission bus. The sensors are essentially pick-ups making it possible to determine the position of the craft with respect to the ground, its attitude and its speed. The displays concerned are the Head-Up sight as well as the Head-Down piloting and navigation screens such as the "Navigation Display" and the "Primary Flight Displays", screens denoted HUD, ND and PFD in FIG. 1.

The dynamic operation of the GCAM is as follows. It monitors the geographical environment of the aircraft. If it finds that there is no risk of terrain threat, near or far, the depictions presented to the pilot and optionally to the copilot are those of a mission of IFR type, the acronym standing for Instrument Flight Rules or VFR type, the acronym standing for Visual Flight Rules. The system is in a mode termed "NORMAL".

When the system determines that there is a possibility of dangerous terrain along the axis of the aircraft and/or laterally, the system passes to a mode termed "LATERAL PROXIMITY". In this mode, the depictions must allow the pilot to carry out the navigation tasks and to comprehend the situation without ambiguity. The distance from the aircraft to the obstacles is of the order of forty Nautical Miles.

In this case, if the pilot does not react, the airplane approaches dangerously close to the terrain, its trajectory touching the relief. As soon as the time before the collision becomes less than about twelve seconds, the system passes to a mode termed "CAUTION". The audible alarm "TERRAIN TERRAIN" sounds. Alarm messages are also displayed on the screens.

The pilot has understood the situation. He must now act by piloting manually. When he has only about eight seconds left to perform a correct avoidance maneuver, the system passes to a mode termed "WARNING". The proposed avoidance maneuver is either vertical of the type "PULL-UP" or involves a turn of the type "PULL UP-TURN RIGHT" or "PULL UP-TURN LEFT". The audible alarms sound. The messages are also displayed on the screens.

The situation reverts to usual. The obstacle is avoided. The system passes back to the "NORMAL" mode or to the "LATERAL PROXIMITY" mode if it remains in the vicinity of potentially dangerous terrains. The audible alarm "CLEAR OF TERRAIN" sounds. This return to normal is accompanied by a return to a conventional display in the customary operating modes.

The GCAM allows notably the generation of a specific audible alarm or "warning" called "Avoid Terrain" in addition to the conventional "warning" called "Pull Up" which corresponds to a vertical avoidance maneuver. This alarm is engaged when an avoidance maneuver by "Pull-Up" no longer makes it possible to ensure a clearance without collision. The "Avoid Terrain" alarm of the GCAM, though representing a significant advance, does not completely meet pilot expectations. They would like to have an indication of lateral avoidance maneuver when no vertical avoidance maneuver is possible any longer.

During the avoidance maneuvers, the pilot must essentially navigate and pilot his machine manually in the vertical and horizontal planes. These tasks are detailed below:

Navigating:
    Identifying/Grading the dangerous obstacles;
    Analyzing the situation to protect oneself from threats;
    Comprehending the new trajectories proposed by the system.

Piloting the machine in the vertical plane:
    Maintaining attention on the current vertical speed;
    Maintaining attention on the current altitude;
    Maintaining attention on the proximity of the ground;
    Being aware of the attitude of the airplane with respect to the real world;
    Maintaining attention on the speed vector of the airplane;
    Maintaining attention on the angle of attack so as to avoid stalling;
    Maintaining a climb slope.

Piloting the machine in the horizontal plane:
  Maintaining attention on the current course followed by the airplane;
  Maintaining attention on the current roll of the airplane;
  Entering a turn correctly;
  Holding a turn correctly;
  Exiting a turn correctly;
  Maintaining a correct trajectory with respect to a predefined avoidance trajectory.

The instrument panels of modern aircraft comprise so-called Head-Down piloting and navigation display screens such as the "Navigation Display" and the "Primary Flight Displays". An exemplary symbology present on a "Navigation Display" is represented in FIG. 2. It conventionally comprises a plan view 100 of the terrain overflown by the aircraft represented on a black background with the indication of the course 200 to be followed as well as a certain number of indications relating to piloting and navigation.

SUMMARY OF THE INVENTION

The object of the invention is to present on a screen of "Navigation Display" type a simplified ergonomic symbology making it possible to improve the perception by the crew of their situation in relation to the terrain. The information necessary for generating this symbology arises from the calculation algorithms developed within the framework of the functionalities implemented in the GCAM system. These algorithms make it possible to calculate the information necessary to present the information on the navigation screen in real time.

More precisely, the subject of the invention is a viewing device for aircraft comprising means for generating and displaying navigation symbols, characterized in that the symbols are at least one arrow representing the direction of the ground speed vector with respect to the axis of the airplane and at least one set of straight segments representing the limit boundaries in plan view beyond which the aircraft will inevitably crash.

Advantageously, the symbology also comprises a symbol representative of the future position of the aircraft in case it were to commence a turn, the symbol possibly being a straight segment terminating in a circle, the time span separating the current position of the aircraft from its future position being about twenty seconds.

Advantageously, the symbology also comprises a symbol representative of the search sector in which a system of GCAM type searches for dangerous zones, the symbol being an angular sector whose radius and angle at the center are variable in real time and transmitted by the GCAM system.

Advantageously, the symbology also comprises a symbol representing the ground track of the instructed course to be followed calculated by the GCAM system, symbolized by two sets of parallel straight segments, the distance separating the two sets representing the width of the clearance path, each set being able to comprise at most ten straight segments and the width of the clearance path being equal to of the order of two Nautical Miles.

In a preferential manner, the arrow representing the direction of the ground speed vector and the symbol representative of the future position of the aircraft consist of white strokes, the search sector and the ground track of the instructed course consist of magenta strokes and the limit boundaries consist of red strokes.

Finally, the symbols are displayed either superimposed on a plan view cartographic representation of the terrain overflown, or superimposed on a plan view representation of the dangerous zones comprising a risk of collision with the relief in a given sector.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

MORE DETAILED DESCRIPTION

Figure 1:
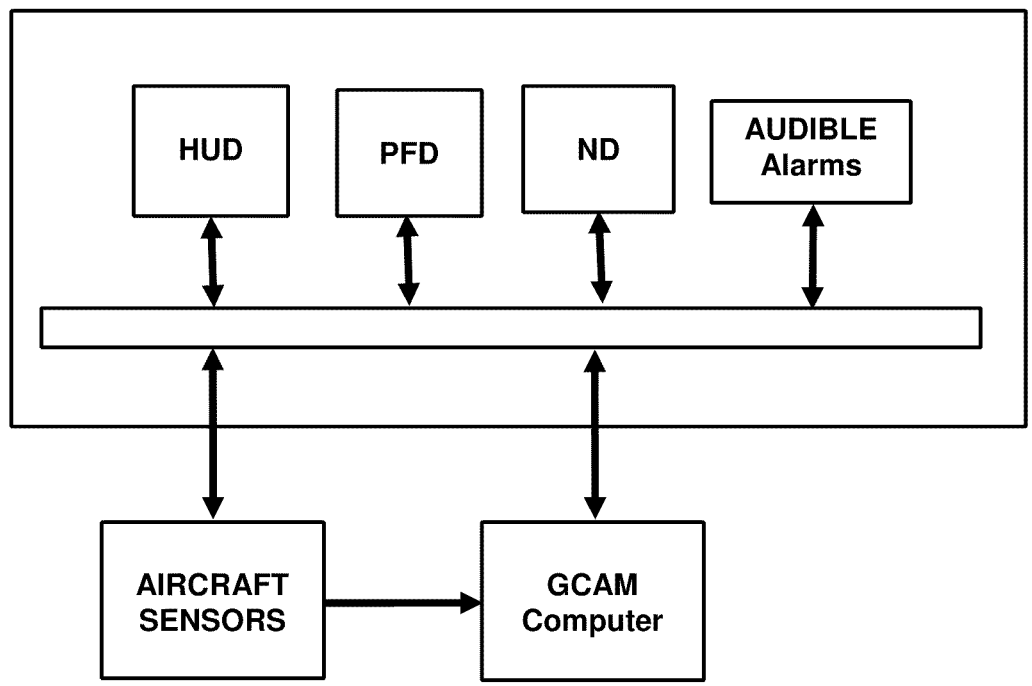
FIG. 1 represents the general schematic of a GCAM system.
Figure 2:
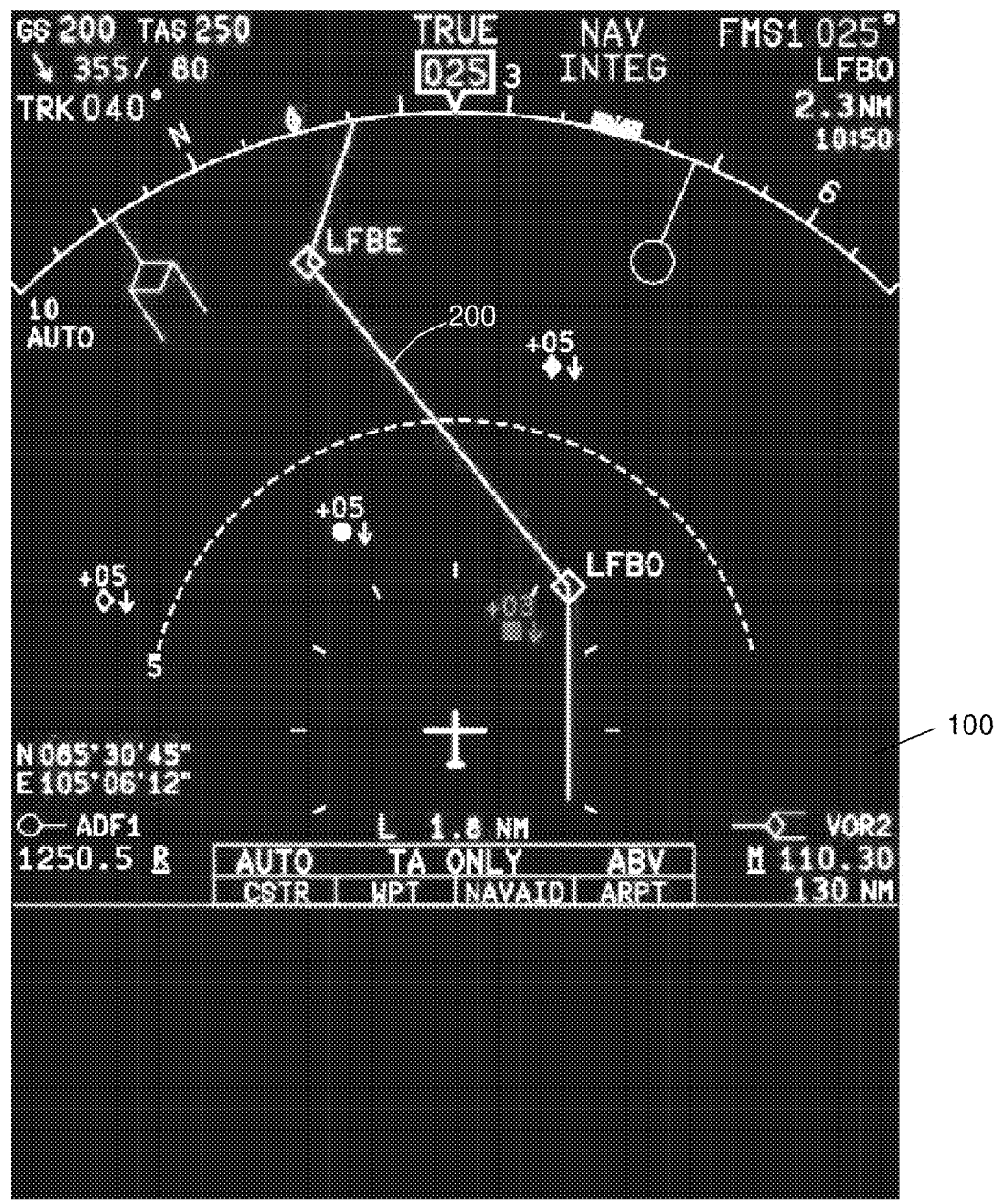
FIG. 2 represents a conventional symbology of a navigation screen according to the prior art.
Figure 3:
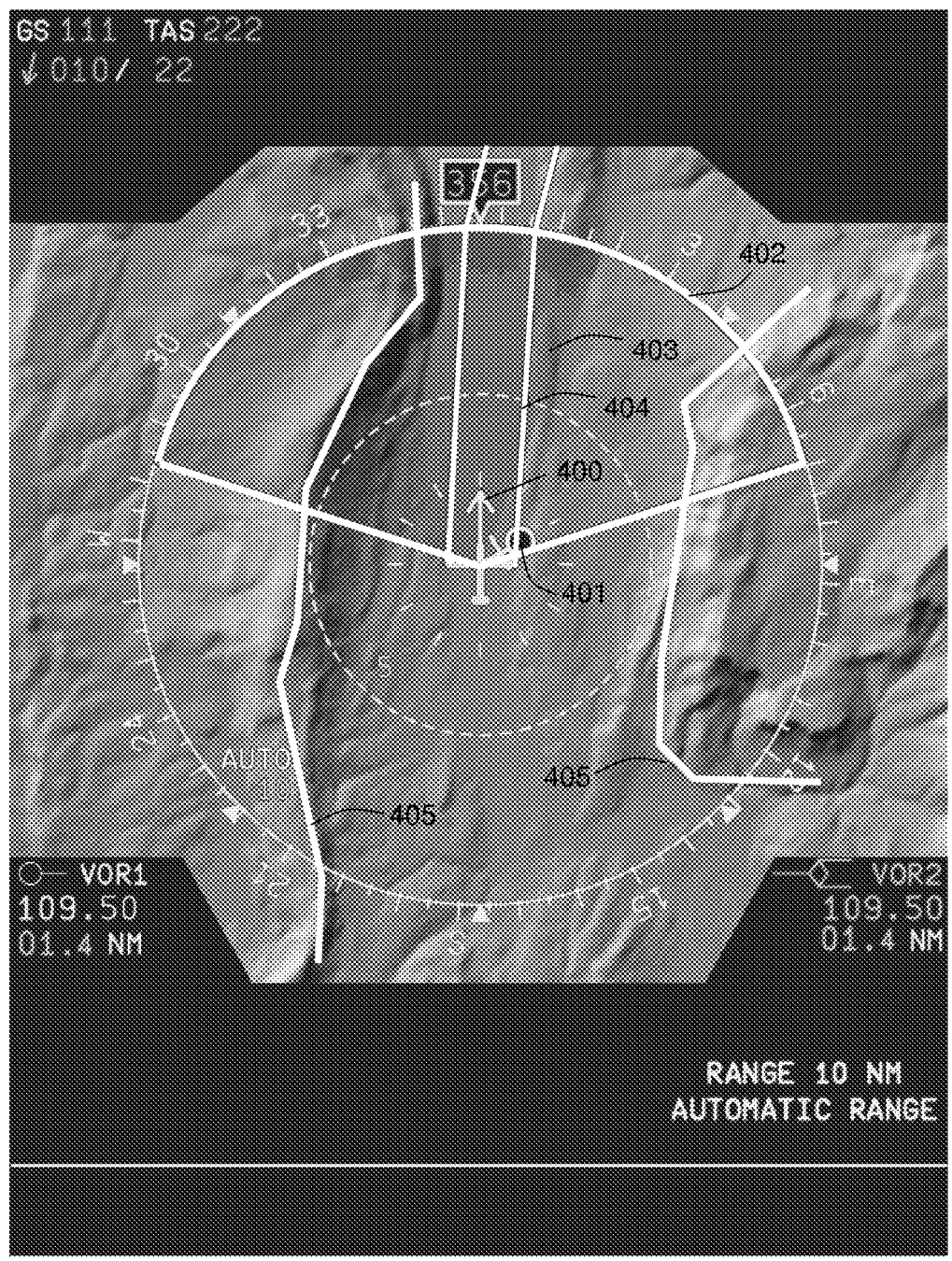
FIG. 3 represents the symbology according to the invention with display of the entire cartography of the terrain overflown.
Figure 4:
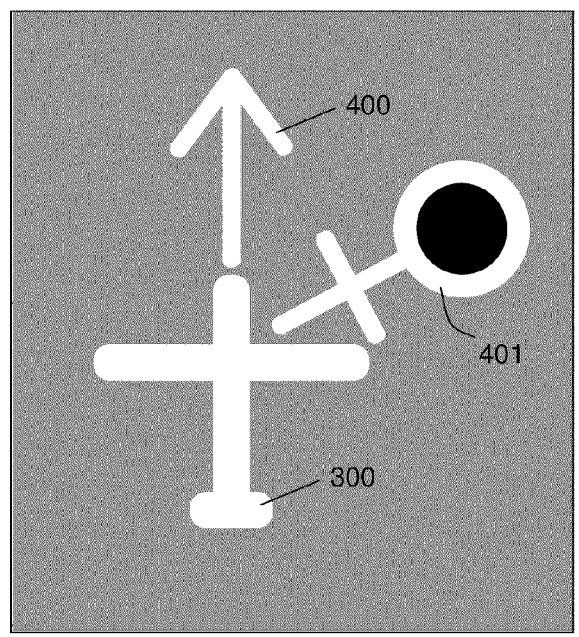
FIG. 4 is an enlargement of the central part of FIG. 3.
Figure 5:
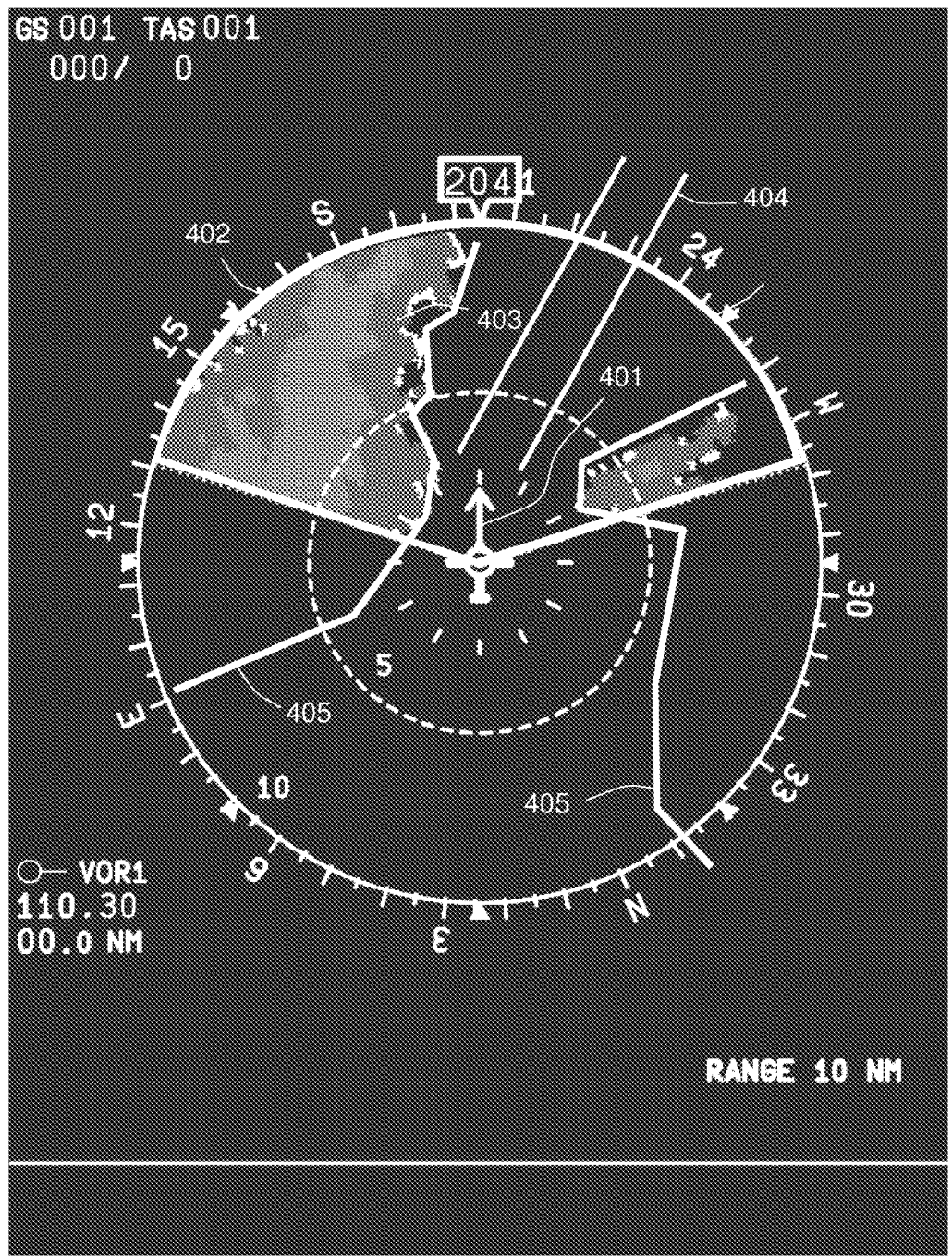
FIG. 5 represents the symbology according to the invention with display of the dangerous zones.

By way of nonlimiting examples, the novel symbology according to the invention is represented in FIGS. 3, 4 and 5. FIGS. 3 and 5 represent the symbology in the "LATERAL PROXIMITY" mode in two different configurations. The symbology according to the invention is common to the two configurations. FIG. 4 is an enlargement of the central part of FIG. 3.

In the first configuration represented in FIG. 3, the symbology according to the invention is represented superimposed on the entire cartography of the terrain overflown viewed in plan. The latter is conventionally represented in false colors with a shading representative of the relief. The false colors appear as gray hues in FIG. 3.

In the second configuration represented in FIG. 5, the symbology according to the invention is represented superimposed on the dangerous zones denoted 403 and comprising a risk of collision with the relief in a given sector. In FIG. 5, the explored sector corresponds to about the upper left quarter of the figure. This mode is called TAWS.

In the two configurations, the aircraft 300 is disposed at the center of the depiction so that the pilot can have a 360-degree view of his environment. It is symbolized conventionally by a vertical bar cut by a large and a small horizontal bar schematically symbolizing an airplane viewed in plan. In the two configurations, changes of scale of the terrain are automatic. The most appropriate scale depends on the current mode of the GCAM ("NORMAL", "LATERAL PROXIMITY", "CAUTION", "WARNING"). The mode of representation is also changed automatically to ROSE mode. The ROSE mode is the only mode making it possible to see the situation in front of and behind the aircraft. It is consistent with the fact that the pilot can make an about-turn according to the dangers encountered by the aircraft.

The symbols according to the invention are detailed below.

The first symbol 400 is an arrow which represents the direction of the ground speed vector with respect to the axis of the airplane, the length of the arrow is independent of the scale. It is preferably white in color and rotates in real time as a function of the movements of the airplane.

The second symbol 401 represents the future position of the aircraft in case it were to commence a turn. The time span separating the current position of the aircraft from its future position is preferably twenty seconds. The choice of this time span of twenty seconds is the result of a compromise between readability and speed of displacement of the aircraft during a turn at the standard rate which corresponds to a complete 360-degree rotation in two minutes, i.e. 60 degrees in twenty seconds. This symbol 401 is represented by a straight segment terminating in a circle. The strokes of this symbol are preferably white in color, the interior of the circle being black. A mid-straight stroke represents the position of the aircraft at ten seconds. This second symbol rotates in real time as a function of the movements of the airplane.

The third symbol 402 represents the dangerous zones search sector of the GCAM system. It is represented by an angular sector whose radius and angle at the center are variable in real time and transmitted by the GCAM system. For the sake of clarity, in FIGS. 3 and 4, the limits of this sector are represented by white strokes. In reality, the color of this sector is magenta. The part 403 represents the zone that has just been scanned by the GCAM system.

The fourth symbol 404 represents the clearance path or else the instructed course to be followed calculated by the GCAM system. It indicates the ground track of the limits of the trajectory to be followed by the aircraft. It is symbolized by two sets of parallel straight segments, the distance separating the two sets representing the width of the clearance path. Each set comprises at most ten straight segments. This width represents a distance of the order of two Nautical Miles, it is transmitted by the GCAM system. The width displayed depends on the scale of the map. The straight segments are also magenta in color.

The fifth symbol 405 corresponds to the indication of the dangerous sectors. It represents a limit boundary beyond which a crash is inevitable. The boundary is represented by straight segments which can delimit open or closed polygons. Several disjoint boundaries can be plotted in real time. These segments are preferably red in color.

This symbology can be applied to a large number of aircraft. The types of aircraft concerned may equally well be rotary-wing or fixed-wing aircraft in meteorological conditions of VMC/IMC type, the acronyms standing for Visual Meteorological Conditions and Instrumental Meteorological Conditions and under flight rules of IFR/VFR type.

However, it applies most particularly to commercial aviation with passenger transports and to cargo planes in cruising flight conditions with departure and arrival at appropriately kitted out aerodromes with a sufficient altitude or one that is low with respect to the surrounding natural obstacles. It also applies to special civilian security or fire missions in low-altitude flight conditions with departure and arrival at appropriately kitted out aerodromes as well as at makeshift airfields.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A viewing device for aircraft comprising a central electronic computer for generating and displaying a depiction comprising a representation of the terrain overflown and comprising navigation symbols, wherein the symbols are at least one arrow representing the direction of the ground speed vector with respect to the axis of the airplane and at least one set of straight segments representing the limit boundaries in plan view beyond which the aircraft will inevitably crash, and the symbols further comprising a representation of a ground track of an instructed course to be followed calculated by an anti-collision system of the aircraft of GCAM type, the ground track symbolized by two sets of parallel straight segments, a distance separating the two sets representing the width of the clearance path, the changes of scale of the terrain being automatic, the most appropriate scale depending on the current mode of the anti-collision system of the aircraft of GCAM type.

2. The viewing device as claimed in claim 1, wherein the symbology also comprises a symbol representative of the future position of the aircraft in case it were to commence a turn.

3. The viewing device as claimed in claim 2, wherein the said symbol representative of the future position of the aircraft is a straight segment terminating in a circle, the time span separating the current position of the aircraft from its future position being about twenty seconds.

4. The viewing device as claimed in claim 1, wherein the symbology also comprises a symbol representative of the search sector in which the system of GCAM type searches for dangerous zones, said symbol being an angular sector whose radius and angle at the center are variable in real time and transmitted by the GCAM system.

5. The viewing device as claimed in claim 1, wherein each set comprises at most ten straight segments and that the width of the clearance path equals of the order of two nautical miles.

6. The viewing device as claimed in claim 1, wherein the arrow representing the direction of the ground speed vector and the symbol representative of the future position of the aircraft consist of white strokes, the search sector and the ground track of the instructed course consist of magenta strokes and the limit boundaries consist of red strokes.

7. The viewing device as claimed in claim 1, wherein the symbols are displayed superimposed on a plan view cartographic representation of the terrain overflown.

8. The viewing device as claimed in claim 1, wherein the symbols are displayed superimposed on a plan view representation of the dangerous zones comprising a risk of collision with the relief in a given sector.

* * * * *